(12) United States Patent
Sung et al.

(10) Patent No.: US 12,284,058 B2
(45) Date of Patent: Apr. 22, 2025

(54) SELF-TUNING FIXED-POINT LEAST-SQUARES SOLVER

(71) Applicant: Samsung Electronics Co., Ltd., Suwon-si (KR)

(72) Inventors: Junmo Sung, Allen, TX (US); Tiexing Wang, Plano, TX (US); Yeqing Hu, Allen, TX (US); Yang Li, Plano, TX (US); Jianzhong Zhang, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 59 days.

(21) Appl. No.: 18/310,422

(22) Filed: May 1, 2023

(65) Prior Publication Data

US 2023/0412428 A1 Dec. 21, 2023

Related U.S. Application Data

(60) Provisional application No. 63/352,794, filed on Jun. 16, 2022.

(51) Int. Cl.
*H04L 25/02* (2006.01)

(52) U.S. Cl.
CPC .................. *H04L 25/024* (2013.01)

(58) Field of Classification Search
CPC ............ H04L 25/0202; H04L 25/024; H04L 25/0242; H04L 25/0244; H04L 25/0246; H04L 25/025; H04L 25/03006; H04L 25/03012; H04L 25/03019; H04L 25/03082; H04L 25/03101

See application file for complete search history.

(56) References Cited

U.S. PATENT DOCUMENTS

| | | | | |
|---|---|---|---|---|
| 5,511,153 | A * | 4/1996 | Azarbayejani | G06T 7/251 345/419 |
| 6,636,561 | B1 * | 10/2003 | Hudson | H04L 25/03038 375/232 |
| 6,873,596 | B2 * | 3/2005 | Zhang | H04L 25/0256 370/210 |
| 7,050,513 | B1 * | 5/2006 | Yakhnich | H04L 25/0242 375/233 |

(Continued)

FOREIGN PATENT DOCUMENTS

| | | |
|---|---|---|
| WO | 2015184549 A1 | 12/2015 |
| WO | 2022071847 A1 | 4/2022 |

*Primary Examiner* — James M Perez

(57) ABSTRACT

A method and device for self-tuning scales of variables for processing in fixed-point hardware. The device includes a sequence of fixed-point arithmetic circuits configured to receive at least one input signal and output at least one output signal. The circuits are preconfigured with control scales associated with each of the input and output signals. A first circuit in the sequence is configured to receive a first input signal having a dynamic true scale that is different from the control scale associated with the first input signal. Each of the circuits is further configured to determine, for each of the output signals, an adaptive scale from the control scale associated with the output signal based on the true scale of the first input signal and the control scale associated with the first input signal, and generate, from the input signal, the output signal having the associated adaptive scale.

20 Claims, 9 Drawing Sheets

(56) References Cited

U.S. PATENT DOCUMENTS

| | | | | |
|---|---|---|---|---|
| 7,092,452 B2* | 8/2006 | Taylor | H04L 1/0048 | 375/267 |
| 7,203,231 B2* | 4/2007 | Laurent | H04L 25/0232 | 375/232 |
| 7,218,665 B2* | 5/2007 | McElwain | H04L 25/03331 | 375/152 |
| 7,289,583 B2* | 10/2007 | He | H04L 25/03993 | 370/347 |
| 7,388,935 B2* | 6/2008 | Hui | H04L 25/0244 | 375/348 |
| 7,420,916 B2* | 9/2008 | Zhang | H04L 25/0256 | 370/335 |
| 7,430,257 B1* | 9/2008 | Shattil | H04B 1/7095 | 375/349 |
| 7,437,230 B2* | 10/2008 | McClure | A01B 69/008 | 701/50 |
| 7,489,746 B1* | 2/2009 | Awater | H04B 7/0854 | 375/361 |
| 7,492,815 B2* | 2/2009 | Guo | H04L 25/0204 | 375/147 |
| 7,502,312 B2* | 3/2009 | Zhang | H04L 25/0256 | 370/210 |
| 7,545,893 B2* | 6/2009 | He | H04L 25/03993 | 327/551 |
| 7,593,449 B2* | 9/2009 | Shattil | H04J 13/10 | 375/150 |
| 7,804,921 B2* | 9/2010 | Hidaka | G01D 21/00 | 375/346 |
| 7,817,754 B2* | 10/2010 | Macleod | H04L 25/0328 | 370/320 |
| 7,822,150 B2* | 10/2010 | Davis | G06Q 30/0283 | 375/340 |
| 7,885,750 B2* | 2/2011 | Lu | B60W 40/076 | 180/197 |
| 8,055,074 B2* | 11/2011 | Monro | G06V 10/478 | 382/199 |
| 8,065,074 B1* | 11/2011 | Liccardo | G01C 21/1654 | 73/504.03 |
| 8,189,559 B2* | 5/2012 | Pi | H04L 1/1819 | 714/752 |
| 8,223,121 B2* | 7/2012 | Shaw | G06F 3/017 | 345/158 |
| 8,284,825 B2* | 10/2012 | Kamalizad | H04B 3/54 | 375/228 |
| 8,284,875 B2* | 10/2012 | Park | H04L 27/2647 | 375/267 |
| 8,340,199 B2* | 12/2012 | Nam | H04L 5/0007 | 375/267 |
| 8,379,743 B2* | 2/2013 | Bury | H04L 25/0242 | 375/267 |
| 8,494,099 B2* | 7/2013 | Arviv | H04B 7/0413 | 370/464 |
| 8,605,839 B2* | 12/2013 | Jiang | H04L 1/20 | 375/342 |
| 8,611,409 B2* | 12/2013 | Robert | H04L 25/0244 | 370/335 |
| 8,811,550 B2* | 8/2014 | Corona | H04L 25/03006 | 375/346 |
| 8,873,613 B2* | 10/2014 | Aubert | H04L 25/0246 | 375/232 |
| 8,981,984 B2* | 3/2015 | Dasgupta | H03M 1/089 | 341/161 |
| 8,995,590 B2* | 3/2015 | Challa | H04L 25/03019 | 375/267 |
| 9,070,202 B2* | 6/2015 | Chandraker | G06T 7/73 | |
| 9,125,191 B2* | 9/2015 | Papasakellariou | H04W 72/21 | |
| 9,296,495 B2* | 3/2016 | Hartmann | B64G 1/369 | |
| 9,306,725 B2* | 4/2016 | Papasakellariou | H04L 5/0048 | |
| 9,354,237 B2* | 5/2016 | Tao | C07K 1/22 | |
| 9,403,273 B2* | 8/2016 | Payton | B25J 9/163 | |
| 9,407,303 B2* | 8/2016 | Menon | H04B 7/08 | |
| 9,408,198 B2* | 8/2016 | Papasakellariou | H04W 72/21 | |
| 9,414,239 B2* | 8/2016 | Brunk | G01S 5/0289 | |
| 9,537,552 B2* | 1/2017 | Li | H04L 5/005 | |
| 9,655,091 B2* | 5/2017 | Papasakellariou | H04L 5/0057 | |
| 9,702,674 B2* | 7/2017 | Fairfax | F42B 10/26 | |
| 10,048,385 B2* | 8/2018 | Yu | G01S 19/29 | |
| 10,237,096 B2* | 3/2019 | Ringh | H04L 25/03834 | |
| 10,327,213 B1* | 6/2019 | Han | H04W 52/0206 | |
| 10,447,211 B2* | 10/2019 | Rollins | H03F 1/3294 | |
| 10,735,066 B2* | 8/2020 | Mo | H04B 7/0482 | |
| 10,859,709 B2* | 12/2020 | Yu | G01S 19/29 | |
| 10,868,605 B2* | 12/2020 | Wang | H04B 7/0626 | |
| 10,891,754 B2* | 1/2021 | Siessegger | G06T 7/70 | |
| 10,911,111 B2* | 2/2021 | Hu | H04B 7/0417 | |
| 10,929,746 B2* | 2/2021 | Litvak | G06F 7/5443 | |
| 10,973,440 B1* | 4/2021 | Martin | G06T 13/40 | |
| 11,284,473 B2* | 3/2022 | Qiu | H04W 76/10 | |
| 11,367,216 B2* | 6/2022 | Siessegger | G06T 7/73 | |
| 11,504,029 B1* | 11/2022 | Martin | H04W 4/027 | |
| 11,558,590 B2* | 1/2023 | Damberg | H04N 9/3167 | |
| 11,609,242 B1* | 3/2023 | Martin | G01P 13/00 | |
| 11,672,426 B2* | 6/2023 | Wang | G01N 21/1702 | 600/407 |
| 11,700,047 B2* | 7/2023 | Lee | H04B 7/0691 | 375/347 |
| 11,791,871 B2* | 10/2023 | Banuli Nanje Gowda | H04B 7/0456 | 375/267 |
| 11,877,102 B2* | 1/2024 | Damberg | G02B 27/50 | |
| 11,940,277 B2* | 3/2024 | Roumeliotis | G01C 21/28 | |
| 12,019,147 B2* | 6/2024 | Advani | G01S 13/862 | |
| 12,021,583 B2* | 6/2024 | Lee | H04L 5/0053 | |
| 12,132,548 B2* | 10/2024 | Jeon | H04L 25/0222 | |
| 2003/0152142 A1* | 8/2003 | Laurent | H04L 25/0232 | 375/229 |
| 2003/0198305 A1* | 10/2003 | Taylor | H04L 25/0204 | 375/346 |
| 2004/0181419 A1* | 9/2004 | Davis | H04L 25/03203 | 705/400 |
| 2004/0213360 A1* | 10/2004 | McElwain | H04L 25/0204 | 375/E1.025 |
| 2004/0228295 A1* | 11/2004 | Zhang | H04L 25/0256 | 370/320 |
| 2004/0228392 A1* | 11/2004 | Zhang | H04L 25/0242 | 375/150 |
| 2005/0078777 A1* | 4/2005 | He | H04L 25/0212 | 375/350 |
| 2005/0117532 A1* | 6/2005 | Zhang | H04L 25/03159 | 370/320 |
| 2005/0276356 A1* | 12/2005 | Hui | H04L 25/0244 | 375/340 |
| 2006/0109891 A1* | 5/2006 | Guo | H04L 25/021 | 375/147 |
| 2006/0115026 A1* | 6/2006 | Macleod | H04L 25/03292 | 375/343 |
| 2006/0240795 A1* | 10/2006 | He | H04L 25/03006 | 455/296 |
| 2006/0285531 A1* | 12/2006 | Howard | H04B 7/0413 | 375/267 |
| 2007/0036210 A1* | 2/2007 | Wu | H04L 25/0246 | 375/152 |
| 2007/0042741 A1* | 2/2007 | Wu | H04L 1/0631 | 455/307 |
| 2007/0121766 A1* | 5/2007 | He | H04L 25/03993 | 375/346 |
| 2007/0133814 A1* | 6/2007 | Wu | H04B 7/0891 | 381/71.1 |
| 2007/0153731 A1* | 7/2007 | Fine | H04B 17/336 | 370/329 |
| 2007/0211786 A1* | 9/2007 | Shattil | H04J 13/00 | 375/147 |
| 2007/0280391 A1* | 12/2007 | Hidaka | G01D 21/00 | 375/350 |
| 2008/0279091 A1* | 11/2008 | Zhang | H04L 25/0204 | 370/210 |
| 2009/0028129 A1* | 1/2009 | Pi | H04L 1/1874 | 370/351 |

(56) References Cited

U.S. PATENT DOCUMENTS

| | | | |
|---|---|---|---|
| 2009/0097539 A1* | 4/2009 | Furman | H04L 25/03019 375/232 |
| 2009/0304061 A1* | 12/2009 | Kamalizad | H04L 1/0009 375/228 |
| 2009/0304116 A1* | 12/2009 | Challa | H04L 25/03019 375/340 |
| 2010/0104034 A1* | 4/2010 | Nam | H04L 5/0007 375/260 |
| 2010/0195575 A1* | 8/2010 | Papasakellariou | H04W 72/0446 370/328 |
| 2011/0058618 A1* | 3/2011 | Bury | H04L 27/38 375/260 |
| 2011/0058619 A1* | 3/2011 | Arviv | H04L 25/0244 375/267 |
| 2011/0267923 A1* | 11/2011 | Shin | G01V 1/30 367/49 |
| 2011/0268230 A1* | 11/2011 | Xu | H04L 1/20 375/340 |
| 2011/0280295 A1* | 11/2011 | Corona | H04L 25/03993 375/224 |
| 2011/0299582 A1* | 12/2011 | Robert | H04L 25/0232 375/229 |
| 2012/0069934 A1* | 3/2012 | Jiang | H04L 1/20 375/316 |
| 2013/0185018 A1* | 7/2013 | Sheng | G01B 7/30 702/153 |
| 2013/0243068 A1* | 9/2013 | Aubert | H04B 7/0885 375/232 |
| 2014/0133395 A1* | 5/2014 | Nam | H04B 7/0452 370/328 |
| 2014/0177572 A1* | 6/2014 | Papasakellariou | H04W 72/21 370/329 |
| 2014/0269460 A1* | 9/2014 | Papasakellariou | H04L 5/0048 370/294 |
| 2014/0270484 A1* | 9/2014 | Chandraker | G06T 7/246 382/154 |
| 2014/0301492 A1* | 10/2014 | Xin | H04B 7/0456 375/267 |
| 2014/0323897 A1* | 10/2014 | Brown | A61B 5/4821 600/544 |
| 2015/0023443 A1* | 1/2015 | Menon | H04L 25/03993 375/267 |
| 2015/0041595 A1* | 2/2015 | Hartmann | G01C 21/025 244/158.8 |
| 2015/0080248 A1* | 3/2015 | Tao | G01N 33/6848 506/18 |
| 2015/0336268 A1* | 11/2015 | Payton | G05B 19/423 901/3 |
| 2016/0021653 A1* | 1/2016 | Papasakellariou | H04L 5/0055 370/329 |
| 2016/0080052 A1* | 3/2016 | Li | H04B 7/0632 375/267 |
| 2016/0157254 A1* | 6/2016 | Novlan | H04W 72/02 370/329 |
| 2016/0349026 A1* | 12/2016 | Fairfax | F42B 10/26 |
| 2017/0019272 A1* | 1/2017 | Brannon | H04B 1/0042 |
| 2017/0085846 A1* | 3/2017 | Damberg | H04N 9/3167 |
| 2017/0102465 A1* | 4/2017 | Yu | G01S 19/29 |
| 2018/0048496 A1* | 2/2018 | Ringh | H04L 25/497 |
| 2018/0270457 A1* | 9/2018 | Damberg | G03B 21/006 |
| 2018/0313958 A1* | 11/2018 | Yu | G01S 19/36 |
| 2018/0350098 A1* | 12/2018 | Siessegger | G06T 7/70 |
| 2019/0222275 A1* | 7/2019 | Mo | H04B 7/0482 |
| 2019/0368879 A1* | 12/2019 | Roumeliotis | G07C 5/08 |
| 2020/0014895 A1* | 1/2020 | Damberg | H04N 5/74 |
| 2020/0037392 A1* | 1/2020 | Qui | H04L 67/535 |
| 2020/0099434 A1* | 3/2020 | Wang | H04B 7/0452 |
| 2020/0112352 A1* | 4/2020 | Hu | H04B 7/0417 |
| 2021/0010976 A1* | 1/2021 | Wang | A61B 5/0095 |
| 2021/0082142 A1* | 3/2021 | Siessegger | G06T 7/50 |
| 2021/0092337 A1* | 3/2021 | Damberg | G02B 26/06 |
| 2021/0132213 A1* | 5/2021 | Advani | G01S 13/865 |
| 2021/0320825 A1* | 10/2021 | Banuli Nanje Gowda | H04L 25/03968 |
| 2022/0147806 A1* | 5/2022 | Yun | G06N 3/045 |
| 2022/0200669 A1* | 6/2022 | Banuli Nanje Gowda | H04B 7/0456 |
| 2022/0263564 A1* | 8/2022 | Lee | H04B 7/0814 |
| 2022/0271802 A1* | 8/2022 | Lee | H04B 17/11 |
| 2022/0311489 A1* | 9/2022 | Rakib | H04L 25/0226 |
| 2022/0376758 A1* | 11/2022 | Leng | H04W 72/23 |
| 2023/0113061 A1* | 4/2023 | Zhu | B25J 13/006 700/264 |
| 2023/0179749 A1* | 6/2023 | Damberg | H04N 5/74 348/687 |
| 2023/0379460 A1* | 11/2023 | Andersson | H04N 19/157 |
| 2023/0412428 A1* | 12/2023 | Sung | G06F 7/38 |
| 2024/0022349 A1* | 1/2024 | Chen | G06N 3/0475 |
| 2024/0064044 A1* | 2/2024 | Liu | H04L 25/024 |
| 2024/0179279 A1* | 5/2024 | Damberg | H04N 9/3179 |
| 2024/0187063 A1* | 6/2024 | Jeon | H04B 7/0626 |
| 2024/0230335 A1* | 7/2024 | Roumeliotis | G07C 5/08 |
| 2024/0380423 A1* | 11/2024 | Laporte | H04B 17/104 |

* cited by examiner

SELF-TUNING FIXED-POINT LEAST-SQUARES SOLVER

CROSS-REFERENCE TO RELATED APPLICATION(S) AND CLAIM OF PRIORITY

This application claims priority under 35 U.S.C. § 119(e) to U.S. Provisional Patent Application No. 63/352,794 filed on Jun. 16, 2022, which is hereby incorporated by reference in its entirety.

TECHNICAL FIELD

This disclosure relates generally to wireless communications signal processing. More specifically, this disclosure relates to self-tuning fixed-point least-squares solvers that operate on data having variable bit width and scale.

BACKGROUND

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Complicated signal processing that involves many fixed-point operations requires careful bit width and scale management in order to achieve a good signal to quantization noise ratio (SQNR) as compared to a floating-point operation. This is because operations such as addition and multiplication increase a variable bit width and/or scale, however, bit width and scale cannot be allowed to infinitely increase and need to be reasonably adjusted at some points during processing. Without such management, bit underflow or overflow is highly likely to occur, which may break down the signal processing algorithms.

SUMMARY

Embodiments of the present disclosure provide methods and devices for self-tuning scales of variables for processing in fixed-point hardware.

In one embodiment, an electronic device comprises a sequence of fixed-point arithmetic circuits. Each of the circuits is configured to receive at least one input signal and output at least one output signal. The circuits are preconfigured with control scales associated with each of the at least one input and output signals. A first fixed-point arithmetic circuit in the sequence is further configured to receive a first input signal having a dynamic true scale that is different from the control scale associated with the first input signal. Each of the fixed-point arithmetic circuits is further configured to determine, for each of the at least one output signals, an adaptive scale from the control scale associated with the output signal based on the true scale of the first input signal and the control scale associated with the first input signal, and generate, from the at least one input signal, the at least one output signal having the adaptive scale of the at least one output signal.

In another embodiment, a method of operation of an electronic device comprising a sequence of fixed-point arithmetic circuits configured to receive at least one input signal and output at least one output signal is provided. The method comprises the steps of receiving, at a first fixed-point arithmetic circuit in the sequence, a first input signal having a dynamic true scale that is different from a control scale associated with the first input signal, wherein the fixed-point arithmetic circuits are preconfigured with control scales associated with each of the at least one input and output signals, determining, by each of the fixed-point arithmetic circuits for each of the at least one output signals, an adaptive scale from the control scale associated with the output signal based on the true scale of the first input signal and the control scale associated with the first input signal, and generating, by each of the fixed-point arithmetic circuits from the at least one input signal, the at least one output signal having the adaptive scale of the at least one output signal.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C"

includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that digital signal processing algorithms are typically designed using high precision floating-point operations and then implemented in fixed-point (or FxP) hardware, which is often less precise due to design constraints. SQNR is a measurement of the difference in precision between the fixed-point signal processing operation and its floating-point counterpart. One source of lowered SQNR in binary fixed-point implementation is improperly managed bit width and scale of processed data, where "bit width" refers to the number of bits in a binary number (e.g., the number of bits necessary to represent a decimal value in binary) and "scale" refers to the number of bits in a binary number that represent the fractional portion of the number. That is, the scale value determines the binary point (or radix point) of a binary fixed-point number, which defines which bits represent an integer portion of the number (integer bits) and which bits represent the fractional portion of the number (fractional bits).

Embodiments of the present disclosure further recognize that in fixed-point signal processing the least-squares (LS) solver is one of the most difficult and complex processing operations, as it involves matrix inversion which needs fine-tuning depending on the input and output bit widths and scales to avoid bit underflow or overflow. Input and output scales and bit widths refer to the scales and bit widths of the binary input and output, respectively. When the input has a large range of possible bit widths, the output scale needs to vary dynamically due to the nature of matrix inversion to avoid underflow or overflow. In traditional matrix inversion processing implementations, the output scale is tied to the input scale, and underflow or overflow can easily occur at the extremes of a large range of bit widths.

Accordingly, embodiments of the present disclosure provide methods and apparatuses for implementing binary LS solver operations in fixed-point hardware that accommodates variable bit width inputs and has the self-tuning property. The self-tuning property refers to the capability to adjust the input and output scales of processed data at various arithmetic circuits in the hardware as needed to reduce bit overflow and underflow, thereby improving SQNR.

Figure 1:
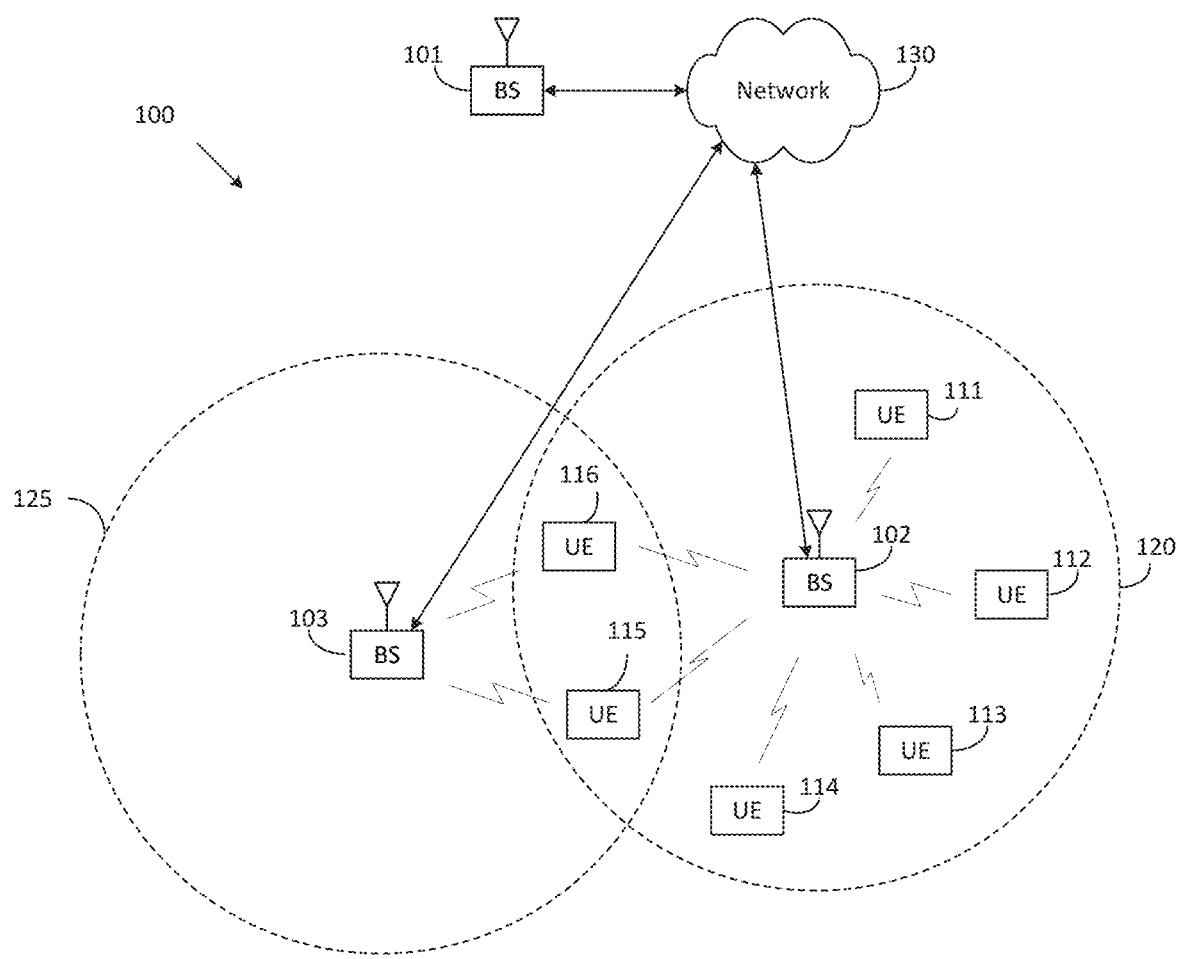
FIG. 1 illustrates an example wireless network according to embodiments of the present disclosure.
Figure 2:
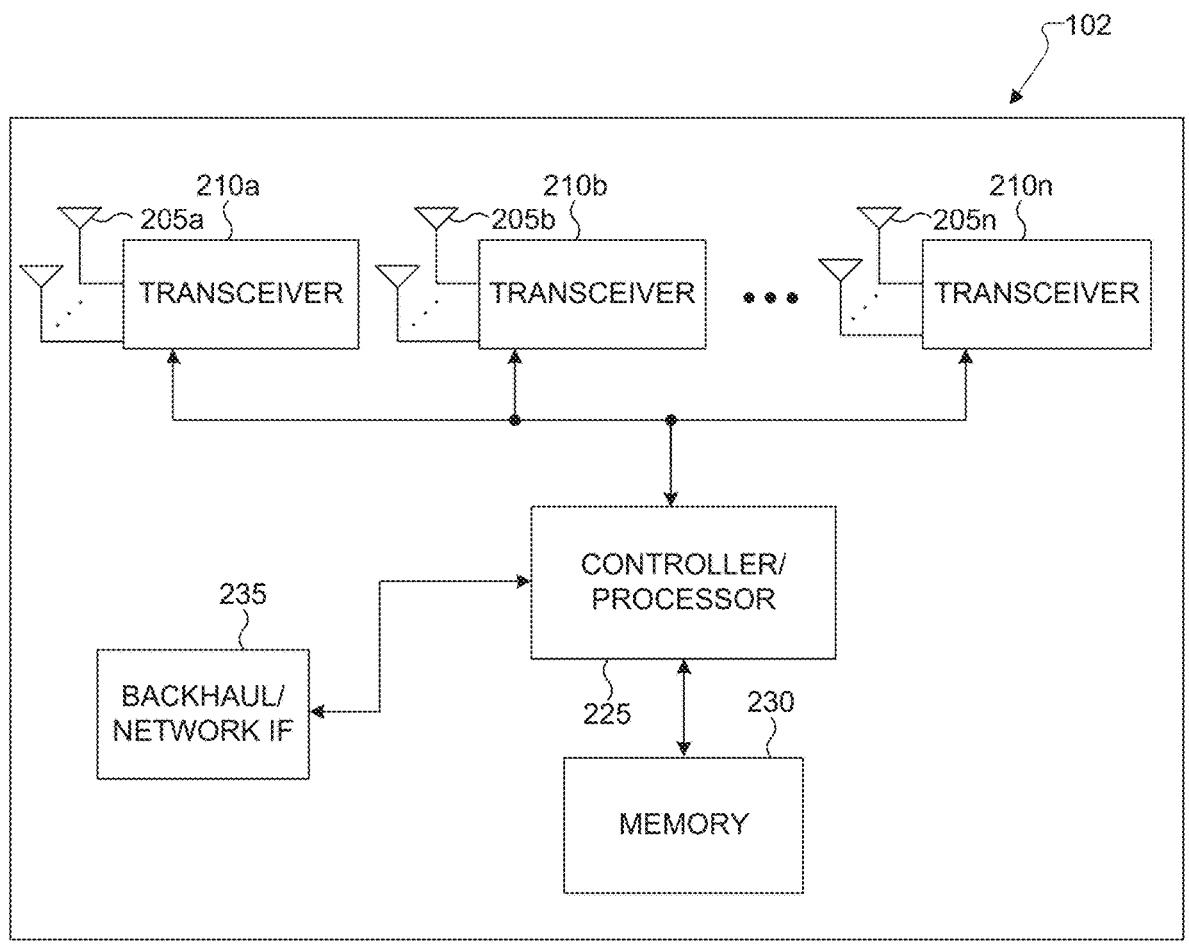
FIG. 2 illustrates an example gNB according to embodiments of the present disclosure.
Figure 3:
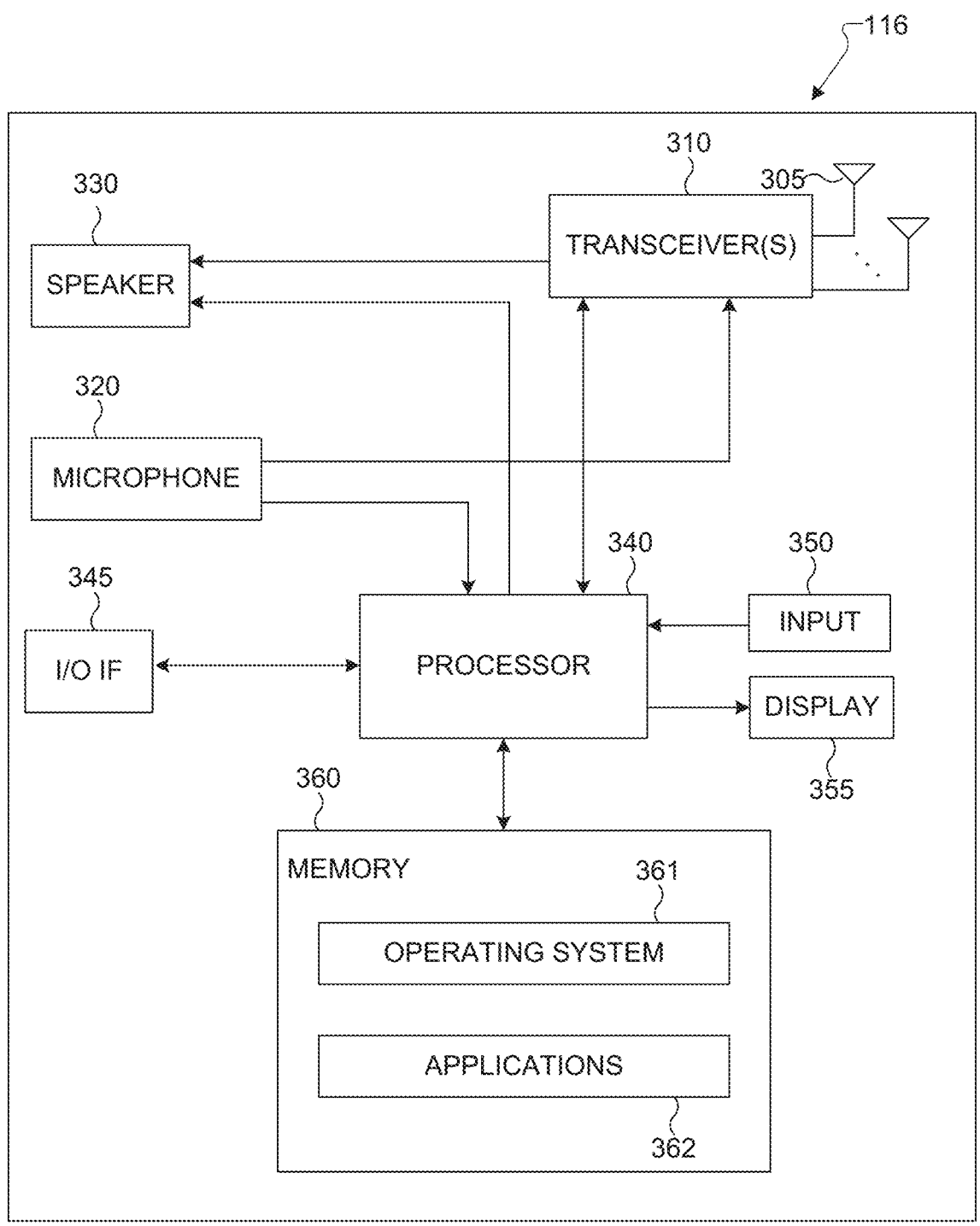
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-convert the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 or the transceivers 210a-210n may include fixed-point arithmetic circuitry that may perform digital signal processing on digital UL or DL channel signals provided to the fixed-point arithmetic circuitry. For example, the fixed-point arithmetic circuitry may perform a least-squares estimate (using, e.g., a Cholesky decomposition and forward-backward substitution approach, as described below) as part of MIMO zero-forcing (ZF), minimum mean squared error (MMSE) precoding, equalization, channel prediction, or other such digital signal processing algorithms. The fixed-point arithmetic circuitry may include application-specific integrated circuits (ASICs), field programmable gate arrays (FPGAs), or similar hardware implementations of one or more digital signal processing algorithms.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 or the transceivers 310 may include fixed-point arithmetic circuitry that may perform digital signal processing on digital UL or DL channel signals provided to the fixed-point arithmetic circuitry. For example, the fixed-point arithmetic circuitry may perform a least-squares estimate (using, e.g., a Cholesky decomposition and forward-backward substitution approach, as described below) as part of MIMO zero-forcing (ZF), minimum mean squared error (MMSE) precoding, equalization, channel prediction, or other such digital signal processing algorithms. The fixed-point arithmetic circuitry may include application-specific integrated circuits (ASICs), field programmable gate arrays (FPGAs), or similar hardware implementations of one or more digital signal processing algorithms.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
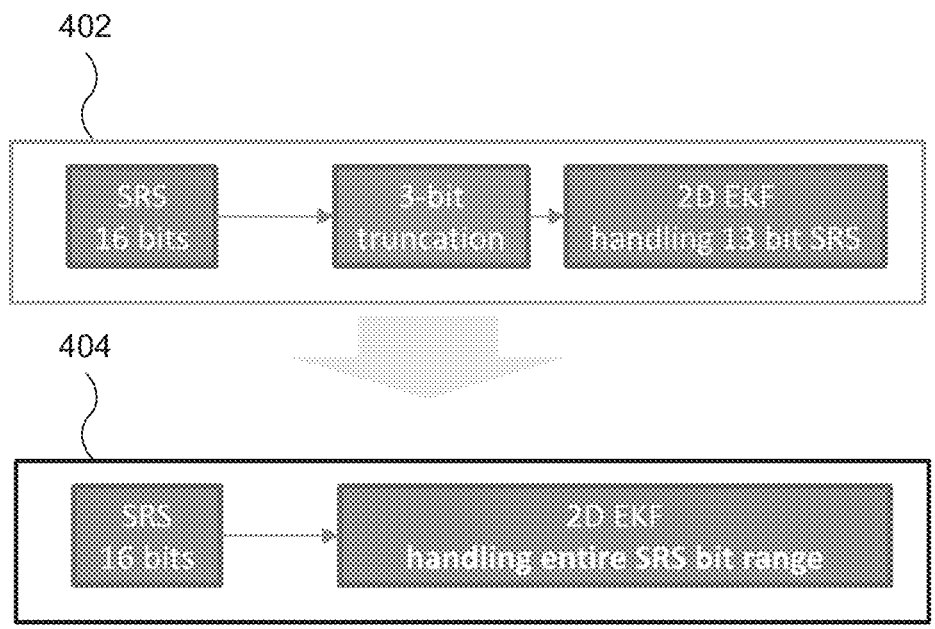
FIG. 4 illustrates example diagrams of digital signal processing algorithms according to embodiments of the present disclosure.

FIG. 4 illustrates example diagrams of digital signal processing algorithms according to embodiments of the present disclosure. As noted above, varying input bit width is one source of decreased SQNR in a fixed-point implementation of a digital signal processing algorithm. As such, existing fixed-point implementations of some algorithms, such as a two-dimensional extended Kalman filter (2D EKF), limit the maximum input bit width to reduce the potential variations in bit width. For example, as illustrated in diagram 402, a sounding reference signal (SRS) is 16 bits, but implementations of the 2D EKF only support 13 bits, requiring truncation of 3 bits of the SRS before input to the 2D EKF. Embodiments of the present disclosure may be used to create the system in diagram 404, which supports processing the full 16 bits of the SRS.

Figure 5:
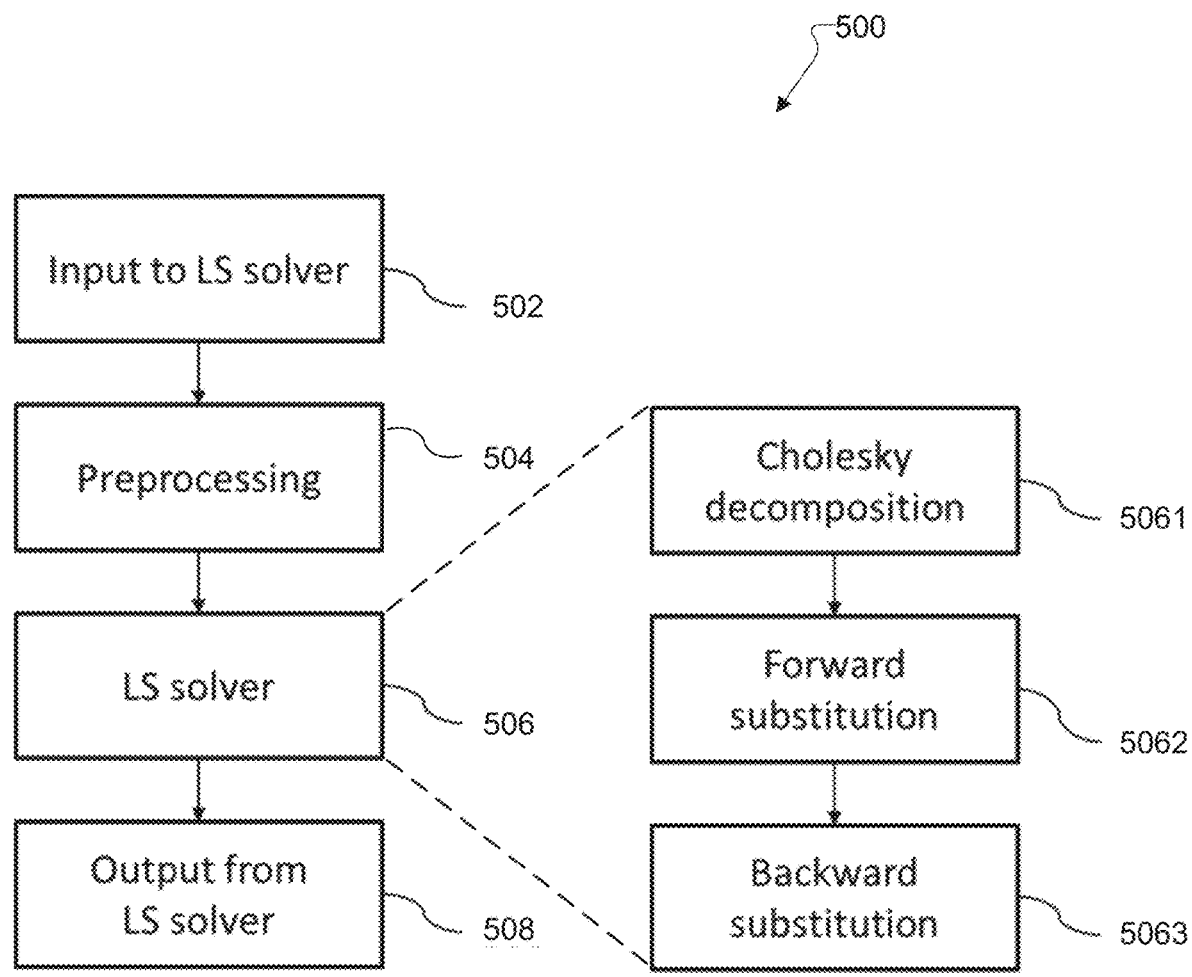
FIG. 5 illustrates an example process flow of a self-tuning fixed-point LS solver according to embodiments of the present disclosure.

FIG. 5 illustrates an example process flow 500 of a self-tuning fixed-point LS solver according to embodiments of the present disclosure. Such a self-tuning fixed-point LS solver could be used, for example, in the fixed-point hardware implementation of the system of diagram 404. Furthermore, such a self-tuning fixed-point LS solver could be implemented in a UE such as UE 116 or a base station such as gNB 102 using fixed-point arithmetic circuits such as fixed-point arithmetic circuitry 365 of UE 116 or fixed-point arithmetic circuitry 240 of gNB 102.

In this example, the LS solver 506 is implemented using a Cholesky decomposition and forward-backward (FW-BW) substitution approach (as shown in blocks 5061, 5062, and 5063, which may represent separate fixed-point arithmetic circuits, or portions of an integrated fixed-point arithmetic circuit). However, it is understood that the disclosure is not limited to this approach, and any other LS solver approach could be implemented using the embodiments of the disclosure disclosed below.

The LS solver 506 solves the following equation for x:

$$y = Ax \quad (1)$$

where A is an M×N complex matrix, y is an M×1 complex vector, and x is an N×1 complex vector. The inputs at 502 are y and A.

For preprocessing operations at 504, $A^H$ is multiplied to both sides of equation (1) to obtain:

$$p = Cx \quad (2)$$

where $C = A^H A$ is an N×N complex Hermitian matrix and $p = A^H y$ is an N×1 complex vector.

The Cholesky-based LS solver 506 first performs Cholesky decomposition at block 5061 to decompose C in the form of $LL^H$ and find L, where L is an N×N complex lower triangular matrix. The Cholesky decomposition block 5061 also generates $I_L$ (an N×1 real vector) as a side product that can reduce the number of operations needed to perform the FW-BW substitution of blocks 5062 and 5063. $I_L$ is a vector with elements that are a reciprocal of the diagonal elements of L.

Once L and $I_L$ are obtained, the FW-BW substitution can be applied to $p = LL^H x$ (at blocks 5062 and 5063) to determine x. More specifically, forward substitution block 5062 performs forward substitution on $p = Lz$ to find z, where $z = L^H x$, and backward substitution block 5063 performs backward substitution on $z = L^H x$ to find x. It is understood that y and x, thus p and x as well, can readily be expanded from vectors to matrices.

The scales of variables in a fixed-point implementation are typically determined during the fixed-point hardware design stage and are provided to each fixed-point module (or arithmetic circuit, e.g., blocks 5061, 5062, and 5063). These pre-determined scales are referred to herein as control scales, denoted as N with a subscript that indicates the variable associated with the scale. The provided control scales are used to track and match the scales in internal operations and output generation. That is, each fixed-point module performs its operations assuming that the variables have scale values that correspond to their provided control scale. In the fixed-point Cholesky-based LS solver 506, the following control scales are provided to the Cholesky decomposition and FW-BW substitution blocks: $N_C$, $N_L$, $N_{IL}$, and $N_p$.

The true scale of a variable, denoted herein as S with a subscript that indicates the variable associated with the scale, refers to the actual scale value of the variable—that is, the scale of the variable as used in previous operations performed on that variable. In conventional designs, the control scale values are assumed to correspond to the true scales of the variables (i.e., the control scale is set equivalent to the true scale by design). In the conventional design of fixed-point Cholesky-based LS solver 506, then, $S_C = N_C$, $S_L = N_L$, $S_{IL} = N_{IL}$, and $S_p = N_p$.

Figure 6:
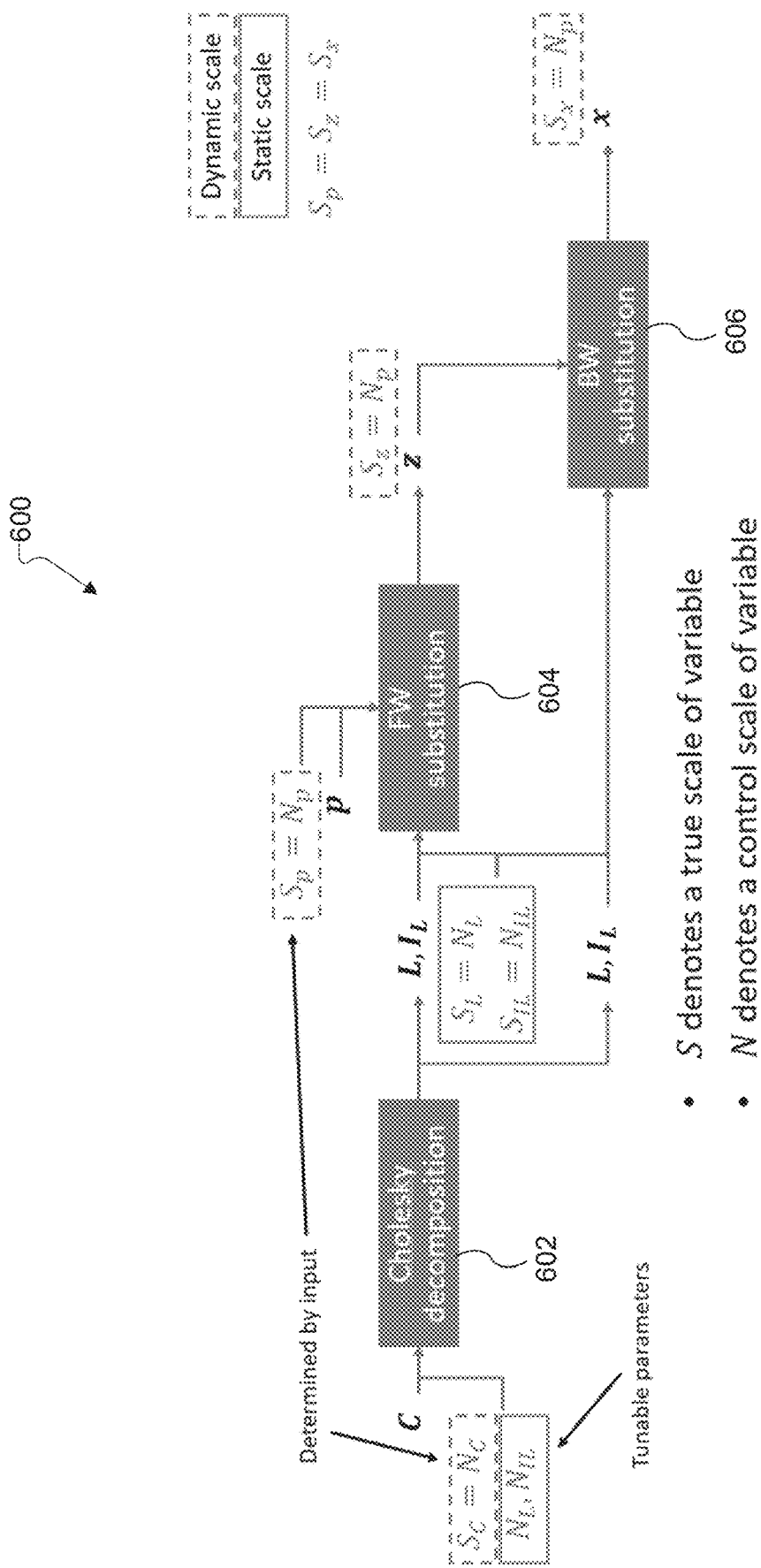
FIG. 6 illustrates an example of a conventional design of a Cholesky-based LS solver according to embodiments of the present disclosure.

FIG. 6 illustrates an example of a conventional design of a Cholesky-based LS solver 600 according to embodiments of the present disclosure. As noted above, the control scales are designed such that $S_C = N_C$, $S_L = N_L$, $S_{IL} = N_{IL}$, and $S_p = N_p$. The outputs of the FW and BW substitution blocks 604 and 606 (which may correspond to blocks 5062 and 5063, respectively, of FIG. 5) may have the same scale as the input p, i.e., $S_p = S_z = S_x$, and therefore $N_p = N_z = N_x$.

The scales associated with the input variables C and p are dynamic in the sense that the true scales of the inputs they are dependent on the source of the inputs. However, because the system is designed to operate under the assumption that $S_C = N_C$ and $S_p = N_p$, the design of the values of the control scales $N_C$ and $N_p$ is constrained based on the expected true scales of the inputs. The values of $N_L$ and $N_{IL}$ are freely tunable during the design phase, however, and therefore may be tuned to optimize operations performed by the blocks of the LS solver 600.

In embodiments of the present disclosure, the input control scale $N_C$ is not constrained to be equivalent to the true scale $S_C$ of its associated input variable C. Accordingly, the values of $N_C$, $N_L$, and $N_{IL}$ are all freely tunable during the design phase and can be arbitrary values of choice. The value of the input control scale $N_C$ being different from the input true scale $S_C$ may have a cascading impact on the scale of all variables in the following operations that is needed to avoid underflow or overflow. This impact will therefore need to be analytically tracked and controlled to avoid underflow or overflow.

Figure 7:
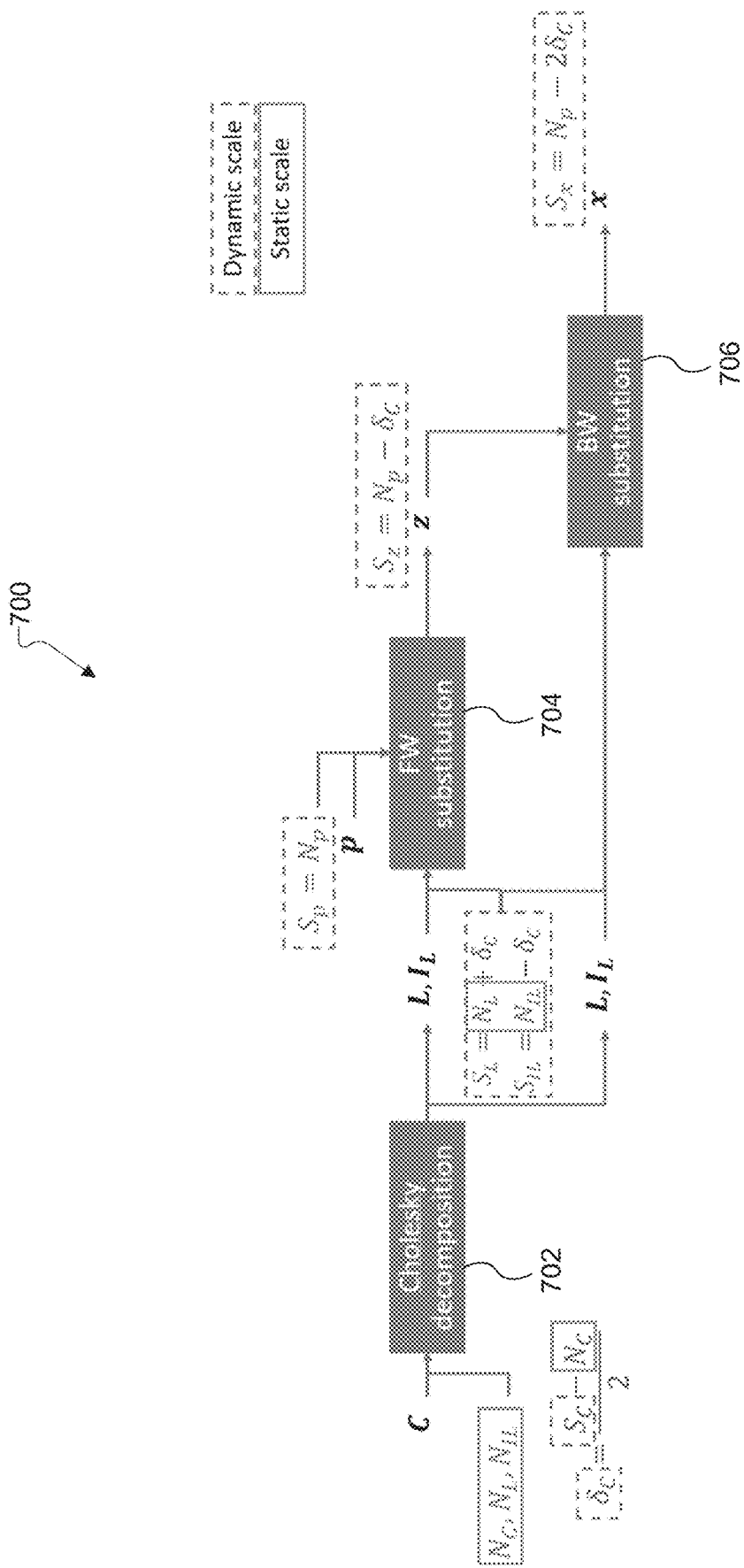
FIG. 7 illustrates an example design of a Cholesky-based LS solver with adaptive scales according to embodiments of the present disclosure.

FIG. 7 illustrates an example design of a Cholesky-based LS solver 700 with adaptive scales according to embodiments of the present disclosure. In this example, $N_C \neq S_C$, i.e., the control scale of the input C may be different from the true scale of C. Accordingly, the true scales of the outputs of the Cholesky decomposition and the FW-BW substitution arithmetic circuits (blocks 702, 704, and 706, respectively, which may correspond to blocks 5061, 5062, and 5063, respectively, of FIG. 5) may be different than the provided control scales (i.e., $N_L \neq S_L$, $N_{IL} \neq S_{IL}$, $N_p \neq S_p \neq S_z \neq S_x$) and are analytically tracked to control potential overflow and underflow.

In various embodiments, the true scales of the variables in the Cholesky-based LS solver 700 are tracked by determining a dynamic scale difference based on $N_C$ and $S_C$, and applying the dynamic scale difference to determine adaptive scale values for $S_L$, $S_{IL}$, $S_z$, and $S_x$. The dynamic scale difference is denoted herein as $\delta_C$. An adaptive scale value herein refers to a dynamic true scale value that is determined by adjusting a provided static control scale value using, e.g., the dynamic scale difference value. It is understood that other terminology could be used to refer to the adaptive scale without affecting this disclosure.

In the embodiment of the example of FIG. 7, the following equations are used to compute L such that $C = LL^H$ in the Cholesky decomposition arithmetic circuit 702:

$$L_{j,j} = \sqrt{C_{j,j} - \sum_{k=1}^{j-1} L_{j,k} L_{j,k}^*}, \quad (3)$$

$$L_{i,j} = I_{L,j}\left(C_{i,j} - \sum_{k=1}^{j-1} L_{i,k} L_{j,k}^*\right) \text{ for } i > j, \text{ where} \quad (4)$$

$$I_{L,j} = \frac{1}{L_{j,j}}$$

and where the subscript i, j denotes the element of the matrix at the row i and column j. In other embodiments, different formulas may be used for similar purposes.

In computation of the equations (3) and (4) for the diagonal elements $L_{j,j}$ and the off-diagonal elements $L_{i,j}$ of L, if $N_C \neq S_C$, $N_L \neq S_L$, and $N_{IL} \neq S_{IL}$, then there will need to be two scale changes in order to satisfy conditions requiring matching scales of variables for performing operations or matching the specified output scale. As a result, the true scale of $L_{j,j}$ and $L_{i,j}$ will be the adaptive scale $S_L = N_L + \delta_C$, where $$\delta_C = \frac{S_C N_C}{2},$$

and the true scale of $I_{L,j}$ will be the adaptive scale $S_{IL} = N_{IL} - \delta_C$. These results are derived below.

In deriving the adaptive scale $S_L$ of L, although the diagonal elements $L_{j,j}$ and the off-diagonal elements $L_{i,j}$ are computed using different equations, they need to have matching scales, as all values of L need to have the same scale. For computation of the diagonal element $L_{j,j}$ for j=1 using equation (3), $\sqrt{C_{1,1}}$ has the scale of $$S_{sqrt} + \frac{S_C}{2}.$$

The adaptive output true scale $S_L$ can then be obtained from the following equation for output scale matching using the output control scale $N_L$:

$$S_L = S_{sqrt} + \frac{S_C}{2} - \left(S_{sqrt} + \frac{N_C}{2} - N_L\right)$$
$$= \frac{(S_C - N_C)}{2} + N_L \quad \text{where}$$
$$= N_L + \delta_C$$
$$\delta_C = \frac{S_C - N_C}{2}.$$

For computation of the diagonal elements $L_{j,j}$ for j≠1 using equation (3), first $C_{j,j}$ and $L_{j,k} L_{j,k}^*$ must have matching scales to perform the operation $C_{j,j} - \sum_{k=1}^{j-1} L_{j,k} L_{j,k}^*$. Accordingly, the true scale of $L_{j,k} L_{j,k}^*$, which is $2S_L$, is changed to $2S_L - (2N_L - N_C)$ after scale matching to the true scale of $C_{j,j}$, which is $S_C$, based on the output control scale $N_L$ and the input control scale $N_C$. Using the previously obtained value of $S_L = N_L + \delta_C$, it can be confirmed that:

$$S_C = 2S_L - (2N_L - N_C)$$
$$= 2(N_L + \delta_C) - (2N_L - N_C)$$
$$= 2\delta_C + N_C$$
$$= S_C - N_C + N_C$$
$$= S_C$$

Next, the scale of $\sqrt{C_{j,j} - \sum_{k=1}^{j-1} L_{j,k} L_{j,k}^*}$, which is $$S_{sqrt} + \frac{S_C}{2},$$

is scale matched to the specified output scale based on the control scales to become:

$$S_L = S_{sqrt} + \frac{S_C}{2} - \left(S_{sqrt} + \frac{N_C}{2} - N_L\right)$$
$$= \frac{(S_C - N_C)}{2} + N_L$$
$$= N_L + \delta_C$$

where $\delta_C = \frac{S_C - N_C}{2}$.

For computation of the off-diagonal elements $L_{i,j}$ using equation (4), the scale of $C_{i,j} - \sum_{k=1}^{j-1} L_{i,k} L_{j,k}^*$ is $S_C = 2S_L - (2N_L - N_C)$ similarly to the diagonal elements. The result of multiplying $C_{i,j} - \sum_{k=1}^{j-1} L_{i,k} L_{j,k}^*$ by $I_{L,j}$ according to equation (4) will have the scale $S_C + S_{IL}$. Output scale matching based on the control scales will result in the following scale change:

$$S_L = S_C + S_{IL} - (N_C + N_{IL} - N_L)$$
$$= \frac{(S_C - N_C)}{2} + N_L$$
$$= N_L + \delta_C$$

where $S_{IL} = N_{IL} - \delta_C$, as derived below. Therefore, the adaptive scale for all elements in L is $S_L = N_L + \delta_C$.

In deriving the adaptive scale $S_{IL}$ of $I_L$, for computation of $$I_{L,j} = \frac{1}{L_{j,j}}$$

the scale of $$\frac{1}{\sqrt{C_{j,j} - \sum_{k=1}^{j-1} L_{j,k} L_{j,k}^*}} \text{ is } S_{sqrt} - \frac{S_C}{2}.$$

To match the specified output scale and obtain the adaptive output true scale $S_{IL}$, the following scale changes are performed.

$$S_{IL} = S_{sqrt} - \frac{S_C}{2} - \left(S_{sqrt} - \frac{N_C}{2} - N_{IL}\right)$$
$$= -\frac{(S_C - N_C)}{2} + N_{IL}$$

-continued $$= N_{IL} - \delta_C$$

where $\delta_C = \frac{S_C - N_C}{2}$.

The FW substitution circuit 704 follows the Cholesky decomposition circuit 702 and solves p=Lz for z, where z=L$^H$x, using the outputs of the Cholesky decomposition, L and I$_L$, according to the following equation:

$$z_i = I_{L,i}\left(p_i - \sum_{k=1}^{i-1} L_{i,k} z_k\right) \quad (5)$$

where z has the same provided control scale as p, i.e., N$_z$=N$_p$. Satisfying the conditions requiring matching scales of variables for performing operations or matching the specified output scale in the FW substitution operation results in the true scale of z being the adaptive scale S$_z$=N$_p$–$\delta_C$. This result is derived below.

In deriving the adaptive scale S$_z$ of z, equation (5) can be expressed as $z_i$=I$_{L,i}$p$_i$ for i=1. The scale of I$_{L,i}$p$_i$ is S$_p$+S$_{IL}$. After output scale matching, this becomes the adaptive output true scale S$_z$:

$$S_z = S_p + S_{IL} - (N_p + N_{IL} - N_z)$$
$$= S_p + S_{IL} - N_{IL}$$
$$= N_p + (N_{IL} - \delta_C) - N_{IL}$$
$$= N_p - \delta_C$$

For computation of $z_i$ for i≠1 using equation (5), first $p_i$ and $L_{i,k}$*$z_k$ must have matching scales to perform the operation $p_i - \Sigma_{k=1}^{i-1} L_{i,k}$*$z_k$. The true scale of $L_{i,k}$*$z_k$, which is S$_L$+S$_z$, is therefore changed to S$_L$+S$_z$–(N$_L$+N$_z$–N$_p$) after scale matching to the true scale of $p_i$, which is S$_p$, based on the control scales N$_L$, N$_z$, and N$_p$. Using the previously obtained values of S$_L$=N$_L$+$\delta_C$ and S$_z$=N$_p$–$\delta_C$, and remembering that S$_p$=N$_p$=N$_z$, it can be confirmed that:

$$S_p = S_L + S_z - (N_L + N_z - N_p)$$
$$= S_L + S_z - N_L$$
$$= (N_L + \delta_C) + (N_p - \delta_C) - N_L$$
$$= N_p$$
$$= S_p$$

Then, for computation of I$_{L,i}$($p_i-\Sigma_{k=1}^{i-1} L_{i,k}$*$z_k$) according to equation (5), the scale of $p_i-\Sigma_{k=1}^{i-1} L_{i,k}$*$z_k$ is S$_p$, and thus the result of multiplying $p_i-\Sigma_{k=1}^{i-1} L_{i,k}$*$z_k$ by I$_{L,i}$ will have the scale S$_p$+S$_{IL}$. Output scale matching based on the control scales will result in the following scale change:

$$S_z = S_p + S_{IL} - (N_p + N_{IL} - N_z)$$
$$= S_p + S_{IL} - N_{IL}$$

-continued $$= N_p + (N_{IL} - \delta_C) - N_{IL}$$
$$= N_p - \delta_C$$

Therefore, the adaptive scale of all elements in z is S$_z$=N$_p$–$\delta_C$.

The BW substitution circuit 706 in turn solves z=L$^H$x for x using the outputs of the Cholesky decomposition circuit 702 and the FW substitution circuit 704 blocks (L, I$_L$, and z) according to the following equation:

$$x_i = I_{L,i}\left(z_i - \sum_{k=i+1}^{N} L_{k,i}^* x_k\right) \quad (6)$$

where x has the same provided control scale as z, i.e., N$_x$=N$_z$=N$_p$. Satisfying the conditions requiring matching scales of variables for performing operations or matching the specified output scale in the BW substitution operation results in the true scale of x being the adaptive scale S$_x$=N$_p$–2$\delta_C$, which can also be expressed as S$_L$+S$_{IL}$=N$_L$+N$_{IL}$. This result is derived below.

In deriving the adaptive scale S$_x$ of x, equation (6) can be expressed as $x_i$=I$_{L,i}$$z_i$ for i=1. The scale of I$_{L,i}$$z_i$ is S$_z$+S$_{IL}$. After output scale matching, this becomes the adaptive output true scale S$_x$:

$$S_x = S_z + S_{IL} - (N_{IL} + N_z - N_x)$$
$$= (N_p - \delta_C) + (N_{IL} - \delta_C) - N_{IL}$$
$$= N_p - \delta_C - \delta_C$$
$$= N_p - 2\delta_C$$

For computation of $x_i$ for i≠1 according to equation (6), first $z_i$ and $L_{k,i}x_k$ must have matching scales to perform the operation $z_i - \Sigma_{k=i+1}^{N} L_{k,i} x_k$. The true scale of $L_{k,i}x_k$, which is S$_L$+S$_x$, is therefore changed to S$_L$+S$_x$–(N$_L$+N$_x$–N$_z$) after scale matching to the true scale of $z_i$, which is S$_z$, based on the control scales N$_L$, N$_x$, and N$_z$. Using the previously obtained values of S$_L$=N$_L$+$\delta_C$, S$_z$=N$_p$–$\delta_C$, and S$_x$=N$_p$–2$\delta_C$, and remembering that S$_p$=N$_p$=N$_x$=N$_z$, it can be confirmed that:

$$S_z = S_L + S_x - (N_L + N_x - N_z)$$
$$= S_L + S_x - N_L$$
$$= (N_L + \delta_C) + (N_p - 2\delta_C) - N_L$$
$$= \delta_C + (N_p - \delta_C) - \delta_C$$
$$= \delta_C + S_z - \delta_C$$
$$= S_z$$

Then, for computation of I$_{L,i}$($z_i-\Sigma_{k=i+1}^{N} L_{k,i}x_k$) according to equation (6), the scale of $z_i-\Sigma_{k=i+1}^{N} L_{k,i}x_k$ is S$_z$, and thus the result of multiplying $z_i-\Sigma_{k=i+1}^{N} L_{k,i}x_k$ by I$_{L,i}$ will have the scale S$_z$+S$_{IL}$. Output scale matching based on the control scales will result in the following scale change:

$$S_x = S_z + S_{IL} - (N_{IL} + N_z - N_x)$$

-continued $$= (N_p - \delta_C) + (N_{IL} - \delta_C) - N_{IL}$$
$$= N_p - \delta_C - \delta_C$$
$$= N_p - 2\delta_C$$

Therefore, the adaptive scale of all elements in x is $S_x = N_p - 2\delta_C$.

As derived above, the true scales of the outputs of the Cholesky decomposition, FW and BW substitution blocks become different than the control scales and are functions of $\delta_C$. When $\delta_C = 0$, this embodiment devolves to the conventional method wherein the true scales and control scales have the same value, i.e., $S_L = N_L$, $S_{IL} = N_{IL}$, and $S_x = N_p$. In this case, $S_L$ and $S_{IL}$ are fixed values that do not vary with the input scale $S_C$ and the final output scale $S_x$ is tied to the input scale $S_p$.

In the present embodiment with $\delta_C \neq 0$, the primary outputs such as L, $I_L$, and x have adaptive scales $S_L = N_L + \delta_C$, $S_{IL} = N_{IL} - \delta_C$, and $S_x = N_p - 2\delta_C$, which can be exploited to make desirable adjustments to the output scales. The control scales in this case function as anchor points, and $\delta_C$ allows adjustment of the true scales $S_L$, $S_{IL}$, and $S_x$ of the outputs and is determined by both the control input scale $N_C$ and the true input scale $S_C$ (i.e., $\delta_C$ varies with the input scale $S_C$). Adjustments may be made to the output scales in order to reduce chances of bit overflow and underflow that would occur in the conventional method. This is referred to as the self-tuning property.

Examples of the benefits provided by a self-tuning fixed-point LS solver follow, in the context of the Cholesky-based LS solver 700 that solves equation (2), p=Cx, for x. For a given input p, the magnitude of x is inversely proportional to the magnitude of C. Likewise, for a given input C, the magnitude of x is inversely proportional to the magnitude of p. For a variable having a given bit width, larger magnitude data needs a smaller scale (as higher integer representation is necessary while less fractional precision is necessary) and smaller magnitude data needs a larger scale (as more fractional precision is necessary while lower integer representation is necessary)—i.e., magnitude is inversely proportional to the required scale.

Figure 8:
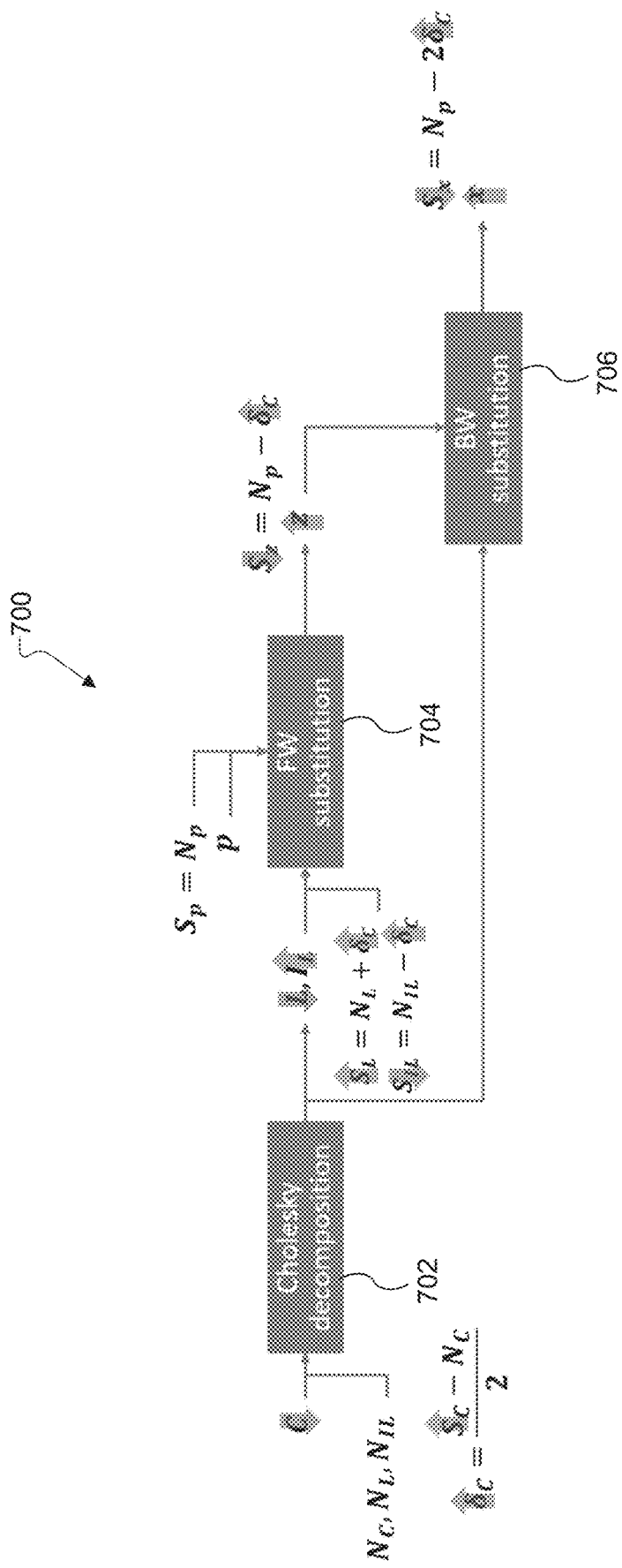
FIG. 8 illustrates an example of scale adaptation using a Cholesky-based LS solver with adaptive scales according to embodiments of the present disclosure.

FIG. 8 illustrates an example of scale adaptation using a Cholesky-based LS solver 700 with adaptive scales according to embodiments of the present disclosure. In the example of FIG. 8, arrows overlaid on a variable or scale represent a change in magnitude of that variable or scale. In this example, the true scale $S_p$ of p is fixed and the true scale $S_C$ of C varies.

When $S_C$ increases, this means that the magnitude of C has decreased. In the Cholesky decomposition circuit 702, when computing $C = LL^H$ to find L and $I_L$, a decrease in the magnitude of C means the magnitude of L will decrease and the magnitude of $I_L$ will increase, therefore the required scale for L will increase and the required scale for $I_L$ will decrease (where "required" scale means the scale needed to avoid underflow and overflow). The embodiments of the present disclosure may accommodate these changes in the required scales for L and $I_L$ due to capability of using adaptive scales $S_L$ and $S_{IL}$.

Following on from the Cholesky decomposition circuit 702, in the FW substitution circuit 704, when computing p=Lz to find z, a decrease in the magnitude of L (and increase in the magnitude of $I_L$) means the magnitude of z will increase (as the magnitude of z is inversely proportional to the magnitude of L and proportional to the magnitude of $I_L$), and thus the required scale for z will decrease. Similarly, in the BW substitution circuit 706, when computing $z = L^H x$ to find x, a decrease in the magnitude of L (and increase in the magnitude of $I_L$) means the magnitude of x will increase (as the magnitude of x is inversely proportional to the magnitude of L and proportional to the magnitude of $I_L$), and thus the required scale for x will decrease. The embodiments of the present disclosure may accommodate these changes in the required scales for z and x due to capability of using adaptive scales $S_z$ and $S_x$.

By comparison, in the case when $\delta_C = 0$ (i.e., using the conventional method with fixed scales), there will be a higher chance of underflow in the computation of L and a higher chance of overflow in the computation of $I_L$ because $S_L$ and $S_{IL}$ are fixed (to $N_L$ and $N_{IL}$, respectively). Additionally, there will be a higher chance of overflow in the computation of z and x, as $S_z$ and $S_x$ are fixed (to $N_p$).

Figure 9:
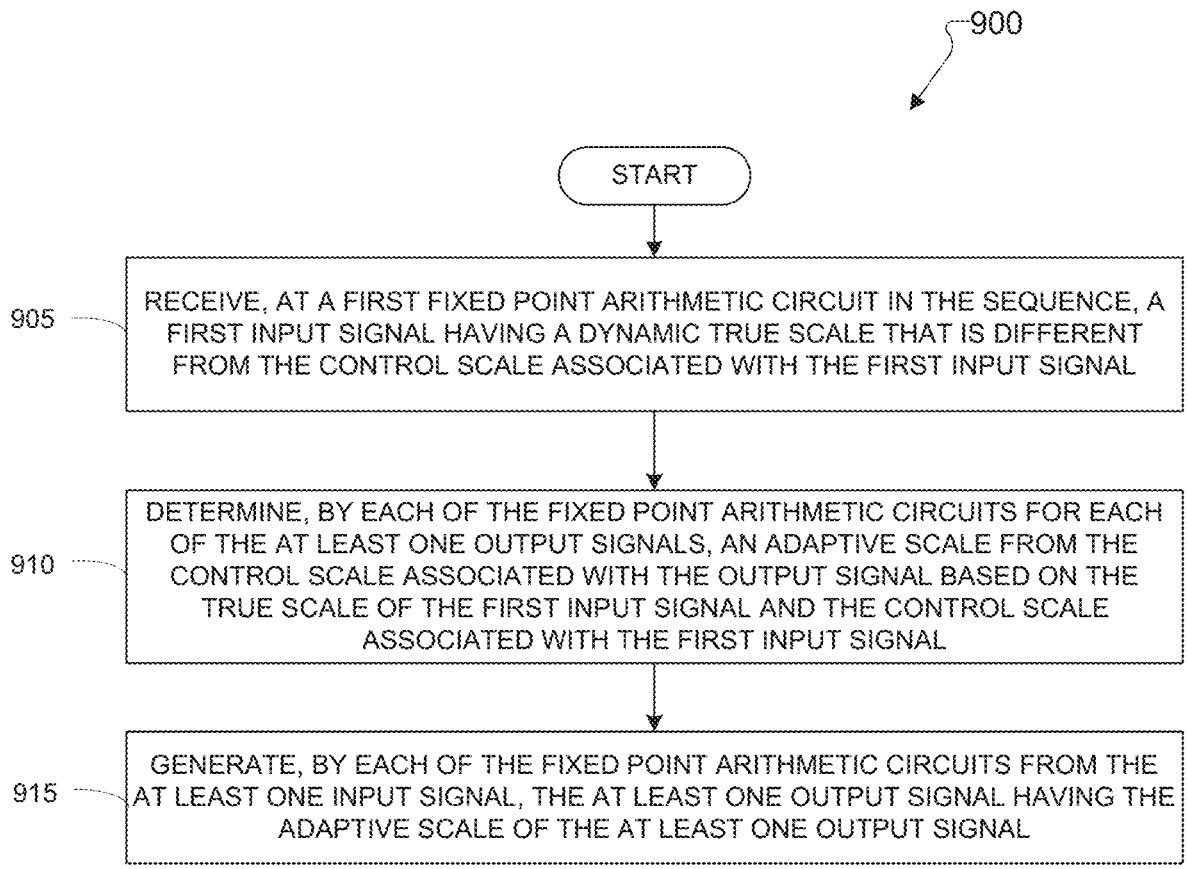
FIG. 9 illustrates an example process for self-tuning scales of variables for processing in fixed-point hardware according to embodiments of the present disclosure.

FIG. 9 illustrates an example process 900 for self-tuning scales of variables for processing in fixed-point hardware according to embodiments of the present disclosure. The process of FIG. 9 may be performed by any appropriate device, such as a UE (e.g., UE 116 of FIGS. 1 and 3) or a gNB (e.g., gNB 102 of FIGS. 1 and 2), that includes a sequence of fixed-point arithmetic circuits configured to implement a digital signal processing algorithm. For simplicity, the process of FIG. 9 is discussed in the context of an LS solving algorithm using adaptive scales, but it is understood that the process could be used with any fixed-point hardware implementation of any suitable digital signal processing algorithm, e.g., an algorithm necessitating matrix inversion.

In the example of FIG. 9, each of the fixed-point arithmetic circuits is configured to receive at least one input signal and output at least one output signal. Furthermore, the fixed-point arithmetic circuits are preconfigured with control scales associated with each of the at least one input and output signals. In some embodiments, the fixed-point arithmetic circuits comprise an LS solver that includes a Cholesky decomposition circuit, a forward substitution circuit, and a backward substitution circuit, and the first circuit in the sequence is the Cholesky decomposition circuit.

The process begins by receiving, at the first fixed-point arithmetic circuit in the sequence, a first input signal having a dynamic true scale that is different from a control scale associated with the first input signal (step 905).

At step 910 of the process, each of the fixed-point arithmetic circuits determines, for each of the at least one output signals, an adaptive scale from the control scale associated with the output signal based on the true scale of the first input signal and the control scale associated with the first input signal. The adaptive scales are determined at step 910 such that likelihoods of bit underflow and bit overflow are reduced in the generation of the at least one output signal having the adaptive scale of the at least one output signal as compared to a generation of the at least one output signal having the control scale associated with the at least one output signal.

In some embodiments, each of the fixed-point arithmetic circuits at step 910 determines, for each of the at least one output signals, the adaptive scale from the control scale associated with the output signal by addition or subtraction of a scale tuning factor (e.g., $\delta$). For example, each of the fixed-point arithmetic circuits subtracts, for each of the at least one output signals that represents a result of an operation that includes matrix inversion, the scale tuning factor from the control scale associated with the output signal to determine the adaptive scale. Each of the fixed-point arithmetic circuits adds, for each of the at least one output signals that represents a result of an operation that does not include matrix inversion, the scale tuning factor to the control scale associated with the output signal to determine the adaptive scale.

In such embodiments, a processor operatively coupled to the fixed-point arithmetic circuits may, at step 910, generate the scale tuning factor using the true scale of the first input signal and the control scale associated with the first input signal. In particular, the scale tuning factor may be one half of the difference between the true scale of the first input signal and the control scale associated with the first input signal.

The process concludes at step 915, where each of the fixed-point arithmetic circuits generates, from the at least one input signal, the at least one output signal having the adaptive scale of the at least one output signal.

In the process 900 a system of linear equations may be defined by the first input signal (e.g., C) and a second input signal (e.g., p) that is received by one of the fixed-point arithmetic circuits (e.g., the forward substitution circuit), wherein the second input signal has a dynamic true scale. In this case a final fixed-point arithmetic circuit in the sequence (e.g., the backward substitution circuit) generates, as the at least one output signal, a solution to the system of linear equations, and determines the adaptive scale of the solution such that it is different from the true scale of the second input signal.

In some embodiments of process 900 the first fixed-point arithmetic circuit in the sequence (e.g., the Cholesky decomposition circuit) performs matrix decomposition on the first input signal to generate at least two decomposition matrices as the output signals (e.g., L and $I_L$). The other fixed-point arithmetic circuits in the sequence then determine the solution to a system of linear equations using the at least two decomposition matrices and the adaptive scales of the at least two decomposition matrices.

In some cases, the fixed-point arithmetic circuitry also includes a preprocessing circuit that preprocesses inputs to the LS solver circuitry. For example, when the fixed-point arithmetic circuits include a Cholesky decomposition circuit, a forward substitution circuit, and a backward substitution circuit, the preprocessing circuit may receive a matrix y and a matrix A as inputs, where y and A define a system of linear equations y=Ax, and may then generate the first input signal C such that $C=A^H A$ and generate the second input signal p such that $p=A^H y$.

The above flowchart illustrates an example method or process that can be implemented in accordance with the principles of the present disclosure and various changes could be made to the methods or processes illustrated in the flowcharts. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An electronic device, comprising:
a sequence of fixed-point arithmetic circuits, each of the circuits configured to:
receive at least one input signal, and
output at least one output signal,
wherein the circuits are preconfigured with respective control scales associated with respective ones of each of the at least one input and output signals,
wherein a first fixed-point arithmetic circuit in the sequence is further configured to receive a first input signal having a dynamic true scale that is different from the respective control scale associated with the first input signal, and
wherein each of the fixed-point arithmetic circuits is further configured to:
determine, for each of the respective at least one output signals, a respective adaptive scale from the respective control scale associated with the respective output signal based on the true scale of the first input signal and the respective control scale associated with the first input signal, and
generate, from the respective at least one input signal, the respective at least one output signal having the respective adaptive scale of the respective at least one output signal.

2. The electronic device of claim 1, wherein each of the fixed-point arithmetic circuits is further configured to:
determine the respective adaptive scales such that likelihoods of bit underflow and bit overflow are reduced in the generation of the respective at least one output signal having the respective adaptive scale of the respective at least one output signal as compared to a generation of the respective at least one output signal having the respective control scale associated with the respective at least one output signal.

3. The electronic device of claim 1, wherein each of the fixed-point arithmetic circuits is further configured to:
determine, for each of the respective at least one output signals, the respective adaptive scale from the respective control scale associated with the respective output signal by addition or subtraction of a respective scale tuning factor.

4. The electronic device of claim 3, further comprising:
a processor operatively coupled to the fixed-point arithmetic circuits, the processor configured to generate the respective scale tuning factor using the true scale of the first input signal and the respective control scale associated with the first input signal.

5. The electronic device of claim 4, wherein the processor is further configured to:
generate the respective scale tuning factor to be one half of the difference between the true scale of the first input signal and the respective control scale associated with the first input signal.

6. The electronic device of claim 3, wherein each of the fixed-point arithmetic circuits is further configured to:
for each of the respective at least one output signals that represents a result of an operation that includes matrix inversion, subtract the respective scale tuning factor from the respective control scale associated with the respective output signal to determine the respective adaptive scale, and
for each of the respective at least one output signals that represents a result of an operation that does not include matrix inversion, add the respective scale tuning factor to the respective control scale associated with the respective output signal to determine the respective adaptive scale.

7. The electronic device of claim 1, wherein:
the first fixed-point arithmetic circuit in the sequence is further configured to perform matrix decomposition on the first input signal to generate at least two decomposition matrices as the output signals, and
the other fixed-point arithmetic circuits in the sequence are configured to determine a solution to a system of linear equations using the at least two decomposition matrices and the adaptive scales of the at least two decomposition matrices.

8. The electronic device of claim 1, wherein:
a system of linear equations is defined by the first input signal and a second input signal that is received by one of the fixed-point arithmetic circuits,
the second input signal has a dynamic true scale, and
a final fixed-point arithmetic circuit in the sequence is further configured to:
  generate, as the at least one output signal, a solution to the system of linear equations; and
  determine the adaptive scale of the solution such that it is different from the true scale of the second input signal.

9. The electronic device of claim 1, wherein:
the first input signal is a Hermitian matrix C having the dynamic true scale $S_C$ and the associated control scale $N_C$,
the first fixed-point arithmetic circuit in the sequence is further configured to:
  perform Cholesky matrix decomposition on C to generate, as the at least one output signal:
    a lower triangular matrix L having the associated control scale $N_L$ and the adaptive scale $S_L$, and
    a vector $I_L$ having the associated control scale $N_{IL}$ and the adaptive scale $S_{IL}$, wherein $I_L$ is a reciprocal of the diagonal elements of L;
  determine $S_L$ from $N_L$ based on $S_C$ and $N_C$; and
  determine $S_{IL}$ from $N_{IL}$ based on $S_C$ and $N_C$,
a second fixed-point arithmetic circuit in the sequence is further configured to:
  receive a second input signal that is a matrix p having a dynamic true scale $S_p$ and the associated control scale $N_p$, wherein $S_p=N_p$;
  perform forward substitution based on p, L, and $I_L$, to generate, as the at least one output signal, a matrix z that is the solution of p=Lz for z, where $z=L^H x$, z having the adaptive scale $S_z$ and the associated control scale $N_z$ such that $N_z=N_p$; and
  determine $S_z$ from $N_p$ based on $S_C$ and $N_C$, and
a third fixed-point arithmetic circuit in the sequence is further configured to:
  perform backward substitution based on z, L, and $I_L$, to generate, as the at least one output signal, a matrix x that is a solution of $z=L^H x$ for x, x having the adaptive scale $S_x$ and the associated control scale $N_x$ such that $N_x=N_p$; and
  determine $S_x$ from $N_p$ based on $S_C$ and $N_C$.

10. The electronic device of claim 9, further comprising:
a preprocessing circuit configured to:
  receive a matrix y and a matrix A as inputs, where y and A define a system of linear equations y=Ax,
  generate the first input signal C such that $C=A^H A$, and
  generate the second input signal p such that $p=A^H y$.

11. A method of operation of an electronic device comprising a sequence of fixed-point arithmetic circuits configured to receive at least one input signal and output at least one output signal, the method comprising:
receiving, at a first fixed-point arithmetic circuit in the sequence, a first input signal having a dynamic true scale that is different from a respective control scale associated with the first input signal, wherein the fixed-point arithmetic circuits are preconfigured with respective control scales associated with respective ones of each of the at least one input and output signals;
determining, by each of the fixed-point arithmetic circuits for each of the respective at least one output signals, a respective adaptive scale from the respective control scale associated with the respective output signal based on the true scale of the first input signal and the respective control scale associated with the first input signal; and
generating, by each of the fixed-point arithmetic circuits from the at least one input signal, the at least one respective output signal having the respective adaptive scale of the at least one output signal.

12. The method of claim 11, further comprising:
determining, by each of the fixed-point arithmetic circuits, the respective adaptive scales such that likelihoods of bit underflow and bit overflow are reduced in the generation of the respective at least one output signal having the respective adaptive scale of the respective at least one output signal as compared to a generation of the respective at least one output signal having the respective control scale associated with the respective at least one output signal.

13. The method of claim 11, further comprising:
determining, by each of the fixed-point arithmetic circuits for each of the respective at least one output signals, the respective adaptive scale from the respective control scale associated with the respective output signal by addition or subtraction of a respective scale tuning factor.

14. The method of claim 13, further comprising:
generating, by a processor operatively coupled to the fixed-point arithmetic circuits, the respective scale tuning factor using the true scale of the first input signal and the respective control scale associated with the first input signal.

15. The method of claim 14, further comprising:
generating, by the processor the respective scale tuning factor to be one half of the difference between the true scale of the first input signal and the respective control scale associated with the first input signal.

16. The method of claim 13, further comprising:
subtracting, by each of the fixed-point arithmetic circuits, for each of the respective at least one output signals that represents a result of an operation that includes matrix inversion, subtract the respective scale tuning factor from the respective control scale associated with the respective output signal to determine the respective adaptive scale; and
adding, by each of the fixed-point arithmetic circuits, for each of the respective at least one output signals that represents a result of an operation that does not include matrix inversion, the respective scale tuning factor to the respective control scale associated with the output signal to determine the respective adaptive scale.

17. The method of claim 11, further comprising:
performing, by the first fixed-point arithmetic circuit in the sequence, matrix decomposition on the first input signal to generate at least two decomposition matrices as the output signals; and
determining, by the other fixed-point arithmetic circuits in the sequence, a solution to a system of linear equations using the at least two decomposition matrices and the adaptive scales of the at least two decomposition matrices.

18. The method of claim 11, wherein:
a system of linear equations is defined by the first input signal and a second input signal that is received by one of the fixed-point arithmetic circuits,
the second input signal has a dynamic true scale, and
the method further comprises:
   generating, by a final fixed-point arithmetic circuit in the sequence as the at least one output signal, a solution to the system of linear equations; and
   determining, by the final fixed-point arithmetic circuit in the sequence, the adaptive scale of the solution such that it is different from the true scale of the second input signal.

19. The method of claim 11, wherein:
the first input signal is a Hermitian matrix C having the dynamic true scale $S_C$ and the associated control scale $N_C$, and
the method further comprises:
   performing, by the first fixed-point arithmetic circuit in the sequence, Cholesky matrix decomposition on C to generate, as the at least one output signal:
      a lower triangular matrix L having the associated control scale $N_L$ and the adaptive scale $S_L$, and
      a vector $I_L$ having the associated control scale $N_{IL}$ and the adaptive scale $S_{IL}$, wherein $I_L$ is a reciprocal of the diagonal elements of L;
   determining, by the first fixed-point arithmetic circuit in the sequence, $S_L$ from $N_L$ based on $S_C$ and $N_C$;
   determining, by the first fixed-point arithmetic circuit in the sequence, $S_{IL}$ from $N_{IL}$ based on $S_C$ and $N_C$;
   receiving, at a second fixed-point arithmetic circuit in the sequence, a second input signal that is a matrix p having a dynamic true scale $S_p$ and the associated control scale $N_p$, wherein $S_p = N_p$;
   performing, by the second fixed-point arithmetic circuit in the sequence, forward substitution based on p, L, and $I_L$, to generate, as the at least one output signal, a matrix z that is the solution of p=Lz for z, where $z=L^H x$, z having the adaptive scale $S_z$ and the associated control scale $N_z$ such that $N_z = N_p$;
   determining, by the second fixed-point arithmetic circuit in the sequence, $S_z$ from $N_p$ based on $S_C$ and $N_C$;
   performing, by a third fixed-point arithmetic circuit in the sequence, backward substitution based on z, L, and $I_L$, to generate, as the at least one output signal, a matrix x that is a solution of $z=L^H x$ for x, x having the adaptive scale $S_x$ and the associated control scale $N_x$ such that $N_x = N_p$; and
   determining, by the third fixed-point arithmetic circuit in the sequence, $S_x$ from $N_p$ based on $S_C$ and $N_C$.

20. The method of claim 19, further comprising:
receiving, at a preprocessing circuit, a matrix y and a matrix A as inputs, where y and A define a system of linear equations y=Ax;
generating, by the preprocessing circuit, the first input signal C such that $C=A^H A$; and
generating, by the preprocessing circuit, the second input signal p such that $p=A^H y$.

* * * * *